(12) United States Patent
Rath et al.

(10) Patent No.: US 7,291,681 B2
(45) Date of Patent: Nov. 6, 2007

(54) POLYISOBUTENAMINES

(75) Inventors: Hans Peter Rath, Grünstadt (DE); Arno Lange, Dürkheim (DE); Dietmar Posselt, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/508,397

(22) PCT Filed: Apr. 4, 2003

(86) PCT No.: PCT/EP03/03548

§ 371 (c)(1),
(2), (4) Date: Sep. 20, 2004

(87) PCT Pub. No.: WO03/085011

PCT Pub. Date: Oct. 16, 2003

(65) Prior Publication Data

US 2005/0171294 A1    Aug. 4, 2005

(30) Foreign Application Priority Data

Apr. 5, 2002 (DE) ................................ 102 15 108

(51) Int. Cl.
    *C08C 19/22* (2006.01)
(52) U.S. Cl. ............... 525/374; 525/333.7; 525/378; 525/379; 525/380
(58) Field of Classification Search .......... 525/374, 525/333.7, 378, 379, 380
See application file for complete search history.

(56) References Cited

U.S. PATENT DOCUMENTS

| 4,152,499 A | 5/1979 | Boerzel et al. |
|---|---|---|
| 4,605,808 A | 8/1986 | Samson |
| 5,169,914 A | 12/1992 | Kaszas et al. |
| 5,286,823 A * | 2/1994 | Rath .................... 526/237 |
| 5,674,955 A | 10/1997 | Kerr et al. |
| 5,910,550 A | 6/1999 | Rath |
| 6,069,281 A * | 5/2000 | Kropp et al. ........... 564/494 |
| 6,133,209 A * | 10/2000 | Rath et al. ............ 508/448 |
| 6,407,186 B1 | 6/2002 | Rath et al. |

FOREIGN PATENT DOCUMENTS

| EP | A 481 297 | 10/1990 |
|---|---|---|
| WO | 97/03946 | 2/1997 |
| WO | 98/20053 | 5/1998 |
| WO | 00/32650 | 6/2000 |
| WO | 02/094889 | 11/2002 |
| WO | 03/051932 | 6/2003 |

OTHER PUBLICATIONS

Database CA, Online, Chemical Abstracts Service, Columbus, Ohio, US; Kennedy et al, "Living carbocationic polymerization. XXXIX. Isobutylene polymerization in the presence of pyridine and various other electron donors", Journal of Macromolecular Science Chemistry, 1991, a28(2), pp. 197-207.

Database CA, Online, Chemical Abstracts Service, Columbus, Ohio, US, Kaszas et al, "Electron pair donors in carbocationic polymerization. I. Introduction into the synthesis of narrow molecular-weight- distribution poly(isobutylenes)", Polymer Bulletin (Berlin, Germany), 1988, 20(5), pp. 413-419.

* cited by examiner

*Primary Examiner*—Roberto Rabago
(74) *Attorney, Agent, or Firm*—Nixon & Vanderhye PC

(57) ABSTRACT

Polyisobutenamines of the formula I:

$$R—X \qquad (I)$$

where R is a polyisobutenyl radical having a number average molecular weight $\overline{M}_n$ of from 500 to 1500 and a polydispersity $\overline{M}_w/\overline{M}_n$ of less than 1.4 and X is an organic radical having amino groups, are prepared and are used as detergent additives in fuel compositions. Additive concentrates contain at least one polyisobutenamine in an amount of from 0.1 to 80% by weight.

14 Claims, No Drawings

POLYISOBUTENAMINES

This application is the US national phase of international application PCT/EP03/03548 filed 4 Apr. 2003 which designated the U.S. and claims benefit of DE 102 15 108.3, dated 5 Apr. 2002, the entire content of which is hereby incorporated by reference.

The present invention relates to novel polyisobutenamines whose polyisobutenyl radicals have a polydispersity of less than or equal to 1.4, a process for their preparation and the use of the polyisobutenamines as fuel additives.

Polyisobutenamines are understood as meaning oligomeric compounds of the formula $R^a$—X, where $R^a$ is a polyisobutenyl radical having a number average molecular weight $\overline{M}_N$ of from 500 to 1500 and X is a polar, organic radical which has one or more amino groups. Polyisobutenamines are of paramount importance as fuel additives for gasoline and diesel engines, in particular for keeping valves and carburetor or injection systems clean, and as lubricant additives (cf. also M. Rossenbeck in Katalysatoren, Tenside, Mineralöladditive, editors J. Falbe, U. Hasserodt, page 223, G. Thieme Verlag, Stuttgart 1978).

Polyisobutenamines are prepared, as a rule, by functionalization of reactive polyisobutenes, i.e. polyisobutenes which have a terminal reactive functionality. Olefinic terminal groups are particularly suitable for the functionalization. Polyisobutenes having a high content of olefinically unsaturated terminal groups are therefore advantageous for the preparation of polyisobutenamines (cf. formulae (A) and (B)).

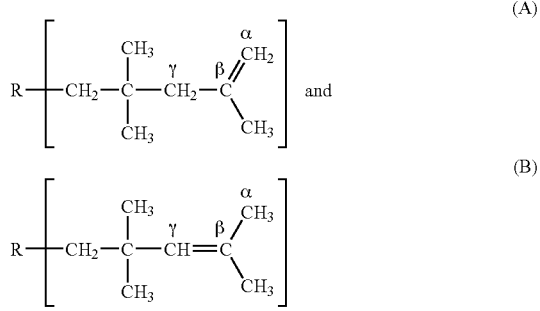

The prior art describes the preparation of olefin-terminated polyisobutenes by cationic polymerization of isobutene or isobutene-containing hydrocarbon streams in the presence of boron trifluoride complex catalysts (cf. for example DE-A 27 02 604, EP-A 145 235, EP-A 481 297, EP 671 419, EP-A 628 575, EP-A 807 641 and WO 99/31151). The polyisobutenes thus obtained have a high content of olefinically unsaturated terminal groups, in particular terminal groups of the formula (A).

However, the polyisobutenamines prepared by functionalizing the abovementioned polyisobutenes have unsatisfactory viscosity behavior, in particular at low temperatures, and may therefore lead to undesirable side effects in engines, for example sticking of valves. This deficiency is as a rule remedied by adding large amounts of carrier oils which themselves have only an insufficient detergent effect, if any at all, and are intended only to improve the viscosity properties of the conventional polyisobutenamines. As a rule, the amount of carrier oil in the additive-containing fuels substantially exceeds the amount of polyisobutenamine. Although the viscosity behavior can be improved by using shorter-chain polyisobutenes, at the same time the detergent effect decreases considerably.

It is an object of the present invention to provide polyisobutenamines which simultaneously have a good detergent effect and improved viscosity behavior. The polyisobutenamines should manage with a substantially reduced amount of additional assistants, in particular carrier oils, without adversely affecting the properties of the additive-containing compositions.

Investigations by the applicant have shown that the disadvantageous viscosity behavior of a conventional polyisobutenamine is due to a comparatively high proportion of products whose polyisobutenyl radicals exceed a molecular weight of 1500 dalton. In other words, the comparatively high molecular nonuniformity of the polyisobutenes obtainable to date, which is characterized by a polydispersity $\overline{M}_W/\overline{M}_N$ (ratio of the weight average molecular weight $\overline{M}_W$ to the number average molecular weight $\overline{M}_N$), results in a comparatively high proportion of undesired polyisobutenamines having long-chain polyisobutenyl radicals.

Although the processes known from the prior art cited at the outset give polyisobutenes having a high proportion of reactive terminal groups, the products obtained thereby still have comparatively high proportions of higher molecular weight products. The molar mass distribution of these polyisobutenes is therefore characterized by polydispersity values $\overline{M}_W/\overline{M}_N$ above 1.6.

Polyisobutene derivatives having a narrow molecular weight distribution of the polyisobutenyl radicals can be prepared in principle by living cationic polymerization of isobutene, cf. for example Kennedy and Ivan, Carbocationic Macromolecular Engineering, Hanser Publishers 1992 and U.S. Pat. No. 5,169,914. Living cationic polymerization is understood as meaning the polymerization of olefins in the presence of an initiator system which comprises a compound suitable for the formation of carbocations, for example a benzyl halide or a tert-alkyl halide or a corresponding benzyl or alkyl ether or ester, as initiator, and a Lewis acid as coinitiator. The polyisobutene derivatives thus obtained generally have a halogen atom as a terminal group and are therefore unsuitable for the preparation of polyisobutenamines.

The applicant has now found that polyisobutenes having a high content of more than 80 mol % of olefinic terminal groups and a polydispersity of less than 1.4 can be prepared by living cationic polymerization if isobutene is polymerized in the presence of an initiator system which comprises, as an initiator, at least one compound of the formula III,

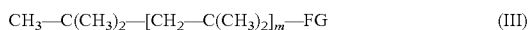
$$CH_3—C(CH_3)_2—[CH_2—C(CH_3)_2]_m—FG \quad (III)$$

where m is 0, 1, 2, 3 or 4 and FG is halogen, alkoxy or acyloxy, if the molar ratio of Lewis acid to compound III is from 5:1 to 1:20. Owing to the high proportion of reactive olefinic terminal groups, the polyisobutenes obtainable in this manner can be converted into polyisobutenamines in a manner known per se.

The present invention thus relates to polyisobutenamines of the formula I:

$$R—X \quad (I)$$

where R is a polyisobutenyl radical having a number average molecular weight $\overline{M}_N$ of from 500 to 1500 and a polydispersity $\overline{M}_W/\overline{M}_N$ of less than 1.4 and X is an organic radical having amino groups.

The present invention furthermore relates to a process for the preparation of polyisobutenamines I, which comprises the following steps:
i) polymerization of isobutene in the presence of an initiator system comprising
   a) a Lewis acid selected from covalent metal chlorides and semimetal chlorides,
   b) and at least one compound of the formula III,

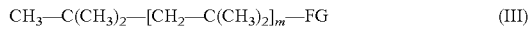

where m is 0, 1, 2, 3 or 4 and FG is halogen, OH, alkoxy, acyloxy, $CH_2C(CH_3)CH_2OH$ or a group

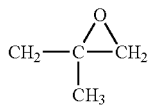

in a solvent which is inert with respect to the Lewis acid, at a molar ratio of Lewis acid to compound III of from 5:1 to 1:20, in particular from 2:1 to 1:10, especially from 1:1 to 1:5, to give a polyisobutene which contains at least 80 mol % of olefinic terminal groups and has a number average molecular weight $\overline{M}_N$ of from 500 to 1500 and a polydispersity $\overline{M}_W/\overline{M}_N$ of less than 1.4, and
ii) introduction in a manner known per se of a radical having amino groups at the olefinic double bond of the polyisobutene obtained in step i).

Polyisobutenyl radicals are understood as meaning those organic hydrocarbon radicals which are composed of a predominant proportion, preferably 80, especially 90, mol % of repeating units of the formula $[-CH_2-C(CH_3)_2-]$, including those radicals where the hydrocarbon atom adjacent to the carbon atom carrying the X group may also have an OH group as a result of the preparation. The X group may be bonded both to the α-carbon atom and to the β- or γ-carbon atom of the polyisobutenyl radical (cf. formulae A and B).

Preferred polyisobutenes are those having a polydispersity $\overline{M}_W/\overline{M}_N$ of up to 1.3, in particular up to 1.2. The number average molecular weight $\overline{M}_N$ is preferably from 600 to 1400, in particular from 650 to 1300, for example from about 670 to 1300.

Suitable groups X are in principle all organic radicals which have at least one basic, primary, secondary or tertiary amino group, for example from 1 to 40 such groups. The molecular weight of these radicals X should preferably not exceed the molecular weight of the polyisobutenyl radical and is preferably from 16 to 1 000. Examples of suitable functional groups X are of the formula II

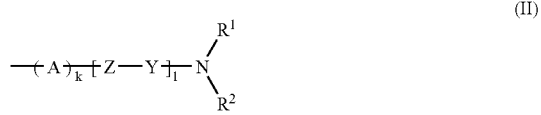

where k and l, independently of one another, are 0 or 1,
A is methylene or phenylene,
Z is O or NR', where
R' is hydrogen, alkyl, hydroxyalkyl, aminoalkyl, cycloalkyl, aryl, aralkyl or a group $-Y-NR^1R^2$,
—Y— is a group

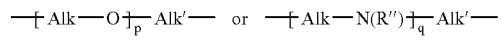

where Alk is $C_2-C_4$-alkylene, p and q, independently of one another, are an integer from 0 to 25 and R" is hydrogen, alkyl or aryl, and Alk' is alkylene which may be interrupted by 1, 2 or 3 nonneighboring oxygen atoms, or is cycloalkylene,
$R^1$ and $R^2$, independently of one another, are hydrogen, alkyl, cycloalkyl, hydroxyalkyl, aryl or aralkyl or a group $Y-NR^3R^4$, where Y has the abovementioned meanings and $R^3$ and $R^4$, independently of one another, are hydrogen, alkyl, cycloalkyl, hydroxyalkyl, aryl or aralkyl, $R^3$ and $R^4$ together with the nitrogen atom to which they are bonded form an unsubstituted or substituted, saturated heterocycle which may contain a further hetero atom selected from oxygen and nitrogen,
$R^1$ and/or $R^2$ may also be R or $-CH_2-R$ if l is 0, R having the abovementioned meaning, or
$R^1$ and $R^2$ together with the nitrogen atom to which they are bonded form an unsubstituted or substituted, saturated heterocycle which may contain a further hetero atom selected from oxygen and nitrogen.

Alkyl is a linear or branched alkyl radical of 1 to 12, preferably 1 to 6, carbon atoms, e.g. methyl, ethyl, n-propyl, isopropyl, n-butyl, 2-butyl, isobutyl, tert-butyl, n-pentyl, 2-pentyl, isopentyl, neopentyl, n-hexyl, 2-methyl-1-pentyl, n-heptyl, 2-ethylhex-1-yl, 2-methylhex-1-yl, n-octyl, n-decyl, 2-methyldec-1-yl, n-dodecyl, etc.

Cycloalkyl is a cycloaliphatic radical of preferably 5 to 10 carbon atoms which may be substituted by 1, 2, 3 or 4 $C_1-C_4$-alkyl groups, e.g. is cyclopentyl, cyclohexyl or cycloheptyl, 1-methylcyclopentyl, 1-methylcyclohexyl or 4,4-dimethylcyclohexyl.

Aryl is, for example, phenyl or naphthyl which may be substituted in the same way as cycloalkyl.

Aralkyl is alkyl, preferably $C_1-C_4$-alkyl, in particular methyl or ethyl, which is substituted by aryl, in particular phenyl, e.g. is benzyl or phenylethyl.

Hydroxyalkyl is alkyl of preferably 1 to 6, in particular 2 to 4, carbon atoms which has a hydroxyl group as a substituent: e.g. is 2-hydroxyethyl, 2- or 3-hydroxylbutyl or 2-, 3- or 4-hydroxybutyl.

Aminoalkyl is alkyl of preferably 1 to 6, in particular 2 to 4, carbon atoms which has an $NH_2-$, $NH(C_1-C_4$-alkyl) or $N(C_1-C_4$-alkyl)$_2$ group as a substituent: e.g. is 2-aminoethyl, 2- or 3-aminopropyl, 2-methylaminoethyl, 2- or 3-methylaminopropyl, 2-dimethylaminoethyl or 2- or 3-dimethylaminopropyl.

Alkoxy is alkyl bonded via an oxygen atom. Accordingly, aryloxy, cycloalkoxy and arylalkoxy are aryl, cycloalkyl and arylalkyl, respectively, bonded via an oxygen atom.

Acyloxy is an alkylcarbonyl radical which is bonded via oxygen and preferably has 1 to 6 carbon atoms in the alkyl moiety, e.g. is acetoxy, propionyloxy, butyroxy, etc.

Alkylene is a divalent linear or branched alkyl group of preferably 2 to 20 carbon atoms, the two free valencies preferably being located on different carbon atoms. $C_2-C_4$-Alkylene is accordingly, for example, 1,2-ethylene or 1,2- or 1,3-propylene. $C_2-C_{20}$-Alkylene accordingly includes the groups stated in the case of $C_2-C_3$-alkylene and, for example, butane-1,2-diyl, butane-2,3-diyl, butane-1,3-diyl or butane-1,4-diyl, pentane-1,2-diyl, pentane-2,3-diyl, pentane-1,3-diyl, pentane-1,4-diyl, pentane-2,4-diyl or pentane-1,5-diyl, hexane-1,6-diyl, 2,2,4-trimethylpentane-1,4-diyl, octane-1,8-diyl, etc. In the alkylene groups, one or two carbon atoms may also be replaced by oxygen atoms which are adjacent neither to one another nor to linkage points. Such alkylene groups are as a rule of 5 to 20 carbon atoms. Examples of these are 3-oxapentane-1,5-diyl, 3-oxahexane-1,6-diyl, 4-oxaheptane-1,7-diyl, 3,6-dioxaoctane-1,8-diyl, 3,7-dioxanonane-1,9-diyl, 4,7-dioxadecane-1,10-diyl, 4,8-dioxaundecane-1,11-diyl, 4,9-dioxadodecane-1,12-diyl and 4,11-dioxatetradecane-1,14-diyl.

$C_5$-$C_{20}$-Cycloalkylene is a divalent cycloaliphatic radical of preferably 5 to 20 carbon atoms. Examples of these are cyclopentane-1,2- and cyclopentane-1,3-diyl, cyclohexane-1,2-diyl, cyclohexane-1,3-diyl and cyclohexane-1,4-diyl, cycloheptane-1,2-diyl, cycloheptane-1,3-diyl and cycloheptane-1,4-diyl.

Preferred compounds of the formula I are those which have no aromatic groups. In principle, compounds of the formula I in which $R^1$ and $R^2$ have one of the meanings stated below are preferred: hydrogen, $C_1$-$C_6$-alkyl, phenyl, 2-hydroxyethyl, 2-aminoethyl, 3-aminopropyl, 2-di($C_1$-$C_4$-alkyl)aminoethyl, 3-di($C_1$-$C_4$-alkyl)aminopropyl or radicals of the formula $[CH_2—CH_2—O]_{p'}—CH_2—CH_2OH$ and $[CH_2—CH_2—NH]_{q'}—CH_2—CH_2NH_2$, where p' and q', independently of one another, are from 1 to 20; and those compounds of the formula I where $NR^1R^2$ is a piperidine, piperazine, N—($C_1$-$C_4$-alkyl)piperazine or morpholine radical. In a particularly preferred embodiment of the invention, $R^1$ and $R^2$ are hydrogen.

If k is 1, A is preferably methylene. If l is 1, R' is preferably hydrogen, $C_1$-$C_6$-alkyl, 2-hydroxyethyl, 2-aminoethyl, 3-aminopropyl, 2-di($C_1$-$C_4$-alkyl)aminoethyl, 3-di($C_1$-$C_4$-alkyl)aminopropyl or a radical of the formula $[CH_2—CH_2—O]_{p'}—CH_2—CH_2OH$ or $[CH_2—CH_2—NH]_{q'}—CH_2—CH_2NH_2$, where p' and q', independently of one another, are from 1 to 10. In the group Y, Alk is then preferably 1,2-ethylene, 1,2-propylene or 1,3-propylene. R" is then preferably hydrogen and Alk' is preferably alkylene of 2 to 10 carbon atoms which may be interrupted by 1, 2 or 3 nonneighboring oxygen atoms.

In the novel process, the polymerization of the isobutene is initiated by the initiator system comprising a Lewis acid and at least one compound of the formula III. It is assumed that the Lewis acid forms with the compound III a carbocation or at least an ionogenic complex which interacts with the olefinically unsaturated double bond of the isobutene and thus produces a positive (partial) charge on the tertiary carbon atom of the isobutene. This charge in turn interacts with a further isobutene molecule with continuation of the polymerization reaction.

The terms carbocation and cationogenic complex are not strictly separate from one another but include all intermediates of solvent-separated ions, solvent-separated ion pairs, contact ion pairs and strongly polarized complexes having a positive partial charge on a carbon atom of the compound I.

Examples of suitable Lewis acids are the (semi)metal chlorides $BCl_3$, $TiCl_4$, $VCl_5$, $SnCl_4$ and $FeCl_3$. Preferred (semi)metal chlorides are $BCl_3$ and $TiCl_4$.

Preferred compounds of the formula III are those in which m is 1, 2, 3 or 4. FG is preferably halogen, in particular chlorine.

For the preparation of the polyisobutenes in the novel process, the compound III is as a rule used in an amount of at least $10^{-2}$, preferably from 0.02 to 0.3, in particular from 0.05 to 0.2, mol per mole of isobutene. Here, it should be taken into account that the resulting molecular weight of the polyisobutene prepared by the novel process is dependent on the amount of compound III in such a way that the molecular weight of the polyisobutene decreases with increasing amount of compound III, based on isobutene.

For the preparation of the polyisobutenes, the Lewis acid is of course used in the novel process in an amount which is sufficient for the formation of the initiator complex. This is as a rule ensured even at low concentrations of the Lewis acid in the reaction medium, generally at least 0.01 mol/l. As a rule, the Lewis acid in the reaction medium will therefore not exceed a concentration of 3, preferably 2, particularly preferably 1, mol/l. In particular, the concentration is from 0.1 to 2, particularly preferably from 0.2 to 1, mol/l.

Preferably, the initiator system comprises, in addition to the compounds III, at least one further aprotic polar compound IV which is suitable for complex formation with the Lewis acid or with the carbocation formed under reaction conditions or ionogenic complex of Lewis acid and compound I. These are Lewis bases (electron donors) which have at least one free electron pair on at least one hetero atom which is selected, for example, from oxygen, nitrogen, phosphorus and sulfur atoms.

Examples of such donor compounds IV are pyridines, such as pyridine and substituted pyridines, in particular sterically hindered pyridines, and furthermore N,N-dialkylamides of aliphatic or aromatic carboxylic acids, such as N,N-dimethylacetamide, N-alkyllactams, such as N-methylpyrrolidone, dialkyl ethers, such as diethyl ether and diisopropyl ether, cyclic ethers, such as tetrahydrofuran, trialkylamines, such as triethylamine, $C_1$-$C_4$-alkyl esters of aliphatic $C_1$-$C_6$-carboxylic acids, such as ethyl acetate, dialkyl thioethers or alkyl aryl thioethers, such as methyl phenyl sulfide, dialkyl sulfoxides, such as dimethyl sulfoxide, alkylnitriles, such as acetonitrile and propionitrile, trialkylphosphines or triarylphosphines, such as trimethylphosphine, triethylphosphine, tri-n-butylphosphine and triphenylphosphine, and nonpolymerizable, aprotic organosilicon compounds which have at least one organic radical bonded via oxygen. This radical is as a rule of 1 to 20 carbon atoms. Examples of such radicals are alkoxy, cycloalkoxy, aryloxy, arylalkoxy and acyloxy(=alkylcarbonyloxy).

Among the abovementioned donors, pyridine and sterically hindered pyridine derivatives and in particular organosilicon compounds are preferred. In a particularly preferred embodiment, at least one organosilicon compound is used as a donor.

Sterically hindered pyridines are those which have bulky alkyl groups at least in the 2- and 6-positions of the pyridine ring, e.g. 2,6-diisopropylpyridine and 2,6-di-tert-butylpyridine.

The donor IV and in particular the organosilicon compound are preferably used in an amount such that the molar ratio of donor molecules IV to the metal atoms or the semimetal atoms in the Lewis acid is from 1:1 000 to 1:1, preferably from 1:1 000 to 1:2, particularly preferably from 1:1 000 to 1:5.

The organosilicon compounds suitable as donor IV may have one or more, e.g. 2 or 3, silicon atoms with at least one organic radical bonded via oxygen. Preferred organosilicon compounds are those which have one, two or three, in particular 2 or 3, organic radicals bonded via oxygen per silicon atom.

Preferred organosilicon compounds are those of the formula IVa:

$$R^a{}_n Si(OR^b)_{4-n} \tag{IVa}$$

where n is 1, 2 or 3, $R^a$ may be identical or different and, independently of one another, are $C_1$-$C_{20}$-alkyl, $C_5$-$C_7$-cycloalkyl, aryl or aryl-$C_1$-$C_4$-alkyl, it being possible for the three last-mentioned radicals also to have one or more $C_1$-$C_{10}$-alkyl groups as substituents, and $R^b$ are identical or different and are $C_1$-$C_{20}$-alkyl or, where n=1 or 2, two different radicals $R^b$ may also form a 2- or 3-membered alkylene unit.

In formula IVa, n is preferably 1 or 2. $R^a$ is preferably a $C_1$-$C_8$-alkyl group, in particular an alkyl group which is branched or which is bonded via a secondary carbon atom, such as isopropyl, isobutyl or 2-butyl, or a 5-, 6- or 7-membered cycloalkyl group. $R^2$ is preferably a $C_1$-$C_4$-alkyl group.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluylsilane and triethoxybenzylsilane.

Suitable isobutene starting materials for the novel process are both isobutene itself and isobutene-containing $C_4$-hydrocarbon streams, for example refined $C_4$ fractions from steam crackers, $C_4$ cuts from the dehydrogenation of isobutane, $C_4$ cuts from steam crackers, $C_4$ cuts from FCC crackers (FCC: fluid catalyzed cracking), provided that they have been substantially freed from 1,3-butadiene contained therein. $C_4$-Hydrocarbon streams suitable according to the invention contain, as a rule, less than 500, preferably less than 200, ppm of butadiene. When $C_4$ cuts are used as starting materials, the hydrocarbons other than isobutene perform the role of an inert solvent.

Suitable solvents are all low molecular weight, organic compounds which differ from the compounds III and IV and from isobutene, have no abstractable protons and are liquid under the polymerization conditions, if necessary as a mixture with one another. Preferred solvents are hydrocarbons, for example acyclic alkanes of 2 to 8, preferably 3 to 7, carbon atoms, such as ethane, isopropane, n-propane, n-butane and its isomers, n-pentane and its isomers, n-hexane and its isomers and n-heptane and its isomers, cyclic alkanes of 5 to 8 carbon atoms, such as cyclopentane, cyclohexane and cycloheptane, acyclic alkenes with preferably 2 to 8 carbon atoms, such as ethene, isopropene, n-propene, n-butene, n-pentene, n-hexene and n-heptene, cyclic olefins, such as cyclopentene, cyclohexene and cycloheptene, aromatic hydrocarbons, such as toluene, xylene and ethylbenzene, and halohydrocarbons, for example halogenated alkanes of 1 to 5 carbon atoms and 1, 2, 3, 4, 5 or 6 halogen atoms, selected from fluorine or in particular chlorine, such as methyl chloride, dichloromethane, trichloromethane, ethyl chloride, 1,2-dichloroethane and 1,1,1-trichloroethane and chloroform, and haloaromatics, such as chlorobenzene.

It is not only the solvents as such but mixtures of these solvents which are suitable. Mixtures are preferred in particular hen the solvent has a melting point above the desired polymerization temperature.

Particularly preferred are solvents and solvent mixtures which comprise at least one hydrocarbon. Particularly preferred among these are solvent mixtures which comprise at least one hydrocarbon and at least one haloalkane. Particularly preferred among these are solvent mixtures which comprise at least one cyclic or acyclic alkane of 4 to 7 carbon atoms, in particular hexane, and at least one chloroalkane, in particular methyl chloride or methylene chloride. Also particularly preferred are solvent mixtures which comprise at least one aromatic hydrocarbon, in particular toluene, and at least one chloroalkane, in particular methyl chloride or methylene chloride. The volume ratio of hydrocarbon to halogenated hydrocarbon is preferably from 1:10 to 10:1, in particular from 4:1 to 1:4. Of course, the chloroalkanes in these mixtures do not comprise any compounds in which chlorine atoms are located on secondary or tertiary carbon atoms. Also particularly preferred are ternary solvent mixtures which comprise at least one aromatic hydrocarbon, in particular toluene, at least one cyclic or acyclic alkane of 4 to 7 carbon atoms, in particular hexane, and at least one chloroalkane, in particular methyl chloride or methylene chloride. The volume ratio of the three abovementioned components is then chosen so that the ratio of alkane to aromatic is from 1:10 to 10:1 and the volume ratio of alkane+aromatic to haloalkane is from 10:1 to 1:1. If the polymerization is carried out with evaporative cooling, then the solvents or the solvent mixture also contain up to 50, e.g. from 5 to 50, preferably from 10 to 30, % by volume of a readily vaporizable solvent component, e.g. ethylene.

Of course, the polymerization is carried out under substantially aprotic, in particular anhydrous, reaction conditions. Aprotic or anhydrous reaction conditions are understood as meaning that the water content (or the content of protic impurities) in the reaction mixture is less than 50 ppm, in particular less than 5 ppm. As a rule, the starting materials will therefore be dried physically and/or by chemical measures before they are used. For example, the aliphatic or cycloaliphatic hydrocarbons preferably used as solvents can be subjected to conventional preliminary purification and preliminary drying and then mixed with an organometallic compound, for example an organolithium, organomagnesium or organoaluminum compound, in an amount sufficient for removing traces of water from the solvent. The solvent thus treated is then condensed directly into the reaction vessel. A similar procedure can also be used with the α-olefins, the aromatic hydrocarbons and the monomers to be polymerized, in particular the isobutene.

The preliminary purification or preliminary drying of the solvent and of the isobutene is effected in a conventional manner, preferably by treatment with solid drying agents, such as molecular sieves or predried oxides, such as calcium oxide or barium oxide. The starting materials for which a treatment with metal alkyls is unsuitable, for example the alkyl halides used as solvents and the compounds III and IV, can be dried in an analogous manner.

As a rule, the novel process is carried out at below room temperature (25° C.), preferably below 0° C., for example from 0 to −140° C., preferably from −30 to −120° C., particularly preferably from −40 to −110° C. As a rule, the greater the purity of the starting materials used, the higher are the possible reaction temperatures. The reaction pressure is of minor importance and depends in a known manner on the apparatuses and other reaction conditions used.

The polymerization of the isobutene or of the isobutene-containing starting material takes place spontaneously on mixing the initiator system used according to the invention with the isobutene or the isobutene-containing starting material in the inert organic solvent at the desired reaction temperature. Here, isobutene can be initially taken in the inert solvent and cooled to reaction temperature and the initiator system then added. In another possible procedure, the initiator system is initially taken in the solvent and then the isobutene or the isobutene-containing starting material is added, either all at once or at the rate of consumption. Moreover, a part or the total amount of the isobutene or of the isobutene-containing starting material can be initially taken in the solvent and then the initiator system added. The remaining amounts of isobutene or isobutene-containing starting material are then added in the course of the reaction, for example at the rate of their consumption. When adding the initiator system, as a rule the components of the initiator system are added separately. In the batchwise procedure described here, as a rule first the compound III and, if required, the compound IV and then the Lewis acid are added. The time of addition of the initiator is then considered to be the time when both components of the initiator system are present in the reaction vessel. For example, first the solvent, then the compound III and, if required, the donor IV and then a part or the total amount of the isobutene or of the isobutene-containing starting material can be initially taken, the polymerization initiated by adding the Lewis acid and then any remaining amounts of isobutene or isobutene-containing starting material added to the polymerization. However, it is also possible to initially take first the solvent, then the Lewis acid and a part or the total amount of the isobutene or of the isobutene-containing starting material and then to initiate the polymerization by adding the compound III and, if required, the compound IV, but this procedure leads to a somewhat broader molecular weight distribution.

In addition to the batchwise procedure described here, the polymerization can also be designed as a continuous process. Here, the starting materials, i.e. the monomers to be polymerized, the solvent and the initiator system, are fed continuously to the polymerization reaction and reaction product is removed continuously so that more or less steady-state polymerization conditions are established in the reactor. The components of the initiator system can be fed in both separately and together, preferably diluted in the solvent. The isobutene to be polymerized or the isobutene-containing starting materials can be fed in as such, diluted with a solvent or as an isobutene-containing hydrocarbon stream. For example, the components of the initiator system which have been diluted in the solvent can be added via multimaterial nozzles in order to achieve thorough mixing of the components.

The heat of reaction in the batchwise as well as in the continuous reaction procedure is removed in a conventional manner, for example by means of internally installed heat exchangers, external heat exchangers and/or cooling of the walls and/or with the use of evaporative cooling. Use of ethene and/or mixtures of ethene with other hydrocarbons and/or halohydrocarbons as solvent has proven particularly suitable here since ethene is not only economical but also has a boiling point in the desired polymerization temperature range.

Suitable reaction vessels for carrying out the novel process are in principle all reactors as usually used in a cationic polymerization of isobutene, for example a cationic polymerization of isobutene with boron trifluoride-oxygen complexes. To this extent, reference is made here to the relevant prior art. In the batchwise reaction procedure, the stirred kettles customary for this purpose, which are preferably equipped with evaporative cooling, external heat exchangers, suitable mixers, feeds, heat exchanger elements and blanketing apparatuses, are suitable. The continuous reaction procedure can be carried out in the conventional reaction kettles, reaction cascades, tubular reactors and tube-bundle reactors, in particular tubular and tube-bundle reactors arranged in a loop, which are preferably equipped in the manner described above for reaction kettles.

In order to recover the polyisobutenes from the reaction mixture, the latter is deactivated, following the polymerization, in the manner customary for cationic polymerization reactions, preferably by adding a protic compound, in particular by adding alcohols, such as methanol, ethanol, n-propanol, isopropanol, n-butanol, isobutanol, sec-butanol or tert-butanol, or mixtures thereof with water. The substances used for the deactivation are preferably used in a diluent, for example one of the solvents, in order to avoid an undesirable increase in viscosity. Besides, reference is made here too to the prior art cited at the outset on the polymerization of boron trifluoride with isobutene, the working-up measures of which can be applied in an analogous manner to the novel process.

The agent used for the deactivation or the mixture thereof with an inert solvent is preferably cooled to the polymerization temperature prior to the deactivation, in order to avoid undesirable secondary reactions.

As a rule, the solvents are then removed in suitable units, for example in rotary, falling-film or thin-film evaporators, or by flash evaporation (letting down the reaction solution downstream of a heat exchanger into pipelines or through an orifice/nozzle plate). As a rule, reduced pressure, for example from 0.1 to 800, preferably from 1 to 100, mbar is applied for removing the solvent. The bottom temperature is preferably from 50 to 250° C., in particular from 150 to 230° C. The use of elevated temperatures, for example above 150° C., in particular 170° C. or higher, leads to a further reduction of residual chlorine content and hence to an increased proportion of terminal double bonds in the reaction product.

The polyisobutenes prepared in step a) of the novel process have a high content of olefinically unsaturated terminal groups of the formula (A) and/or (B). The terminal group content is as a rule at least 80, in particular at least 90, particularly preferably at least 95, mol %, based on the polymer chains. The polyisobutenes prepared in this manner have a narrow molecular weight distribution which is characterized by a polydispersity $D=\overline{M}_W/\overline{M}_N$ of less than 1.4, preferably less than 1.3, in particular less than 1.2, for example from 1.05 to 1.2.

Advantageously, the polyisobutenes obtained according to the invention also have a favorable value for the position of the maximum of the molecular weight distribution ($M_p$) in addition to the low polydispersity. Thus, the peak maximum $M_p$ of the molecular weight distribution of the novel polyisobutenes is preferably less than 10% above the value of the number average molecular weight. In many cases, the peak maximum $M_p$ is even less than 8% or even less than 6% above the number average molecular weight.

All data on molecular weights relate to values as determined by means of gel permeation chromatography (GPC). The gel permeation chromatography was carried out using THF as mobile phase and $CS_2$ as reference on two columns (length 300 mm, diameter 7.8 mm) connected in series, the first column being packed with Styragel HR5 (molecular weight range from 50 000 to $4\times10^6$) and the second column with Styragel HR3 (molecular weight range from 200 to 30 000) from Waters. Detection was performed by means of a differential refractometer. The standards used for determining the isobutene block were commercial polyisobutene standards in the molar mass range from 224 to 1 000 000, from Polymer-Standards Service, Mainz.

The introduction of the functionality X in step b) of the novel process is carried out in a manner known per se. Overviews of suitable aminofunctionalization methods can be found in EP-A 382 405, the publications mentioned below and WO 98/20053 and literature cited there. In addition, numerous processes for the preparation of OH— or aldehyde-functionalized polyisobutenes are described in the literature (cf. for example EP-A 468 966). The polyisobutene derivatives thus prepared can be amino-functionalized in a manner known per se by reductive amination.

Examples of suitable functionalization methods are the functionalization methods (1) to (7) mentioned below and known from the literature:

(1) hydroformylation of the polyisobutene with subsequent reductive amination of the hydroformylation product in the presence of ammonia, amines or amino alcohols or hydroformylation of the polyisobutene in the presence of ammonia, amines or amino alcohols under reducing conditions, as described in EP-A 244 616 or WO 94/24231;

(2) hydroboration of the polyisobutene with subsequent oxidative cleavage of the borane adduct (cf. J. P. Kennedy and B. Ivan Designed Polymers by Carbocationic Macromolecular Engineering, page 178 et seq.) and subsequent reductive amination in the presence of ammonia, amines or amino alcohols, etc. in a manner known per se;

(3) hydroboration or hydroformylation under reducing conditions to give a polyisobutenyl alcohol, followed by an alkoxylation and a reductive amination in the presence of ammonia, amines or amino alcohols (cf. EP-A 277 345, WO 98/20053 or WO 00/50543);

(4) reaction of the polyisobutene with a nitrogen oxide-containing oxidizing agent and subsequent reduction of the $NO_x$ groups thus introduced to $NH_2$ groups, cf. for example DE-A 4425834, WO 96/03367, WO 96/03479, WO 97/03946;

(5) epoxidation of the polyisobutene and subsequent reaction of the epoxidation product with ammonia, an amine or an amino alcohol, if required with subsequent or simultaneous elimination of water and catalytic reduction, cf. for example WO 92/12221, WO 92/14806, EP-A 476 485, EP 539 821, EP-A 696572 and DE-A 19620262;

(6) hydrocyanation of the polyisobutene under acidic catalysis and subsequent hydrolysis in a Ritter reaction, as described in DE-A 2 061 057 or EP-A 567 810 (for the Ritter reaction, also see Houben-Weyl E5, pages 1032-1041 (1985) or Houben-Weyl, XI/1, page 994 f. (1957); or (7) reaction of the polyisobutene with phenol under Friedel-Crafts conditions and subsequent reaction of the polyisobutenylphenol with formaldehyde and amine or diamine in a Mannich reaction (cf. for example EP-A 647 700, U.S. Pat. No. 4,117,011, EP-A 831141).

Among the methods described above, methods (1) to (5) are particularly preferred. The amines used in these methods and in method (7) have, as a rule, the structure on which the group II is based. Examples of suitable amines in addition to ammonia are ethylene-1,2-diamine, propylene-1,2-diamine, propylene-1,3-diamine, butylenediamine, the monoalkyl, dialkyl and trialkyl derivatives of these amines, e.g. N,N-dimethylpropylene-1,3-diamine. It is also possible to use polyalkylenepolyamines whose alkylene radicals are of not more than 6 carbon atoms, for example polyethylenepolyamines, such as diethylenetriamine, triethylenetetramine and tetraethylenepentamine, and polypropylenepolyamines. Also suitable are mono- or dialkylamines in which the alkyl radicals are interrupted by one or more, nonneighboring oxygen atoms and which may also have hydroxyl groups or further amino groups, such as 4,7-dioxadecane-1,10-diamine, ethanolamine, 3-aminopropanol, 2-(2-aminoethoxy) ethanol, N-(2-aminoethyl)ethanolamine. Further examples are N-amino-$C_2$-$C_6$-alkylpiperazines. Ammonia is preferably used. The polyisobutenamines obtained in methods (1) to (7) may furthermore be alkoxylated by reacting them in a known manner with $C_1$-$C_4$-alkylene oxides, such as ethylene oxide, propylene oxide or 1,2-butylene oxide, with or without addition of alkoxides as catalysts. The alkylene oxides are preferably used in a molar ratio of from 1:1 to 1:2, based on the nitrogen atoms in II. Processes for this purpose are known from the prior art. Here, first alkylene oxide is added at the NH bond with ring formation. Further alkylene oxide is then added at the OH group liberated thereby, in the presence of suitable catalysts, for example under OH— catalysis analogous to the method described in EP-A 398 100, or with the use of DMC catalysts (double metal cyanide catalysts) analogous to the method described in WO 00/14045.

Compared with the polyisobutenamines of the prior art, the novel polyisobutenamines of the same number average molecular weight have both an improved detergent effect and improved viscosity properties, in particular at low temperature. This effect is displayed in particular during use as a fuel additive. Owing to the advantageous properties of the novel polyisobutenamines, they can be used with substantially smaller amounts of assistants, such as carrier oils, and thus permit a substantially reduced total content of additives in the compositions while having good to very good efficiency.

The present invention therefore also relates to the use of the novel polyisobutenamines I as fuel additives.

In principle, all gasolines which are suitable for gasoline engines and, in addition to hydrocarbons as the principal component, may also contain other low molecular weight components, for example alcohols, such as methanol, ethanol or tert-butanol, and ethers, e.g. methyl tert-butyl ether, are suitable fuels for treatment with additives. Furthermore, the fuels generally contain further additives, such as corrosion inhibitors, stabilizers, antioxidants, demulsifiers, antistatic agents or ferrocenes. The novel polyisobutenamines are preferably added in an amount of from 10 to 5 000 ppm, in particular from 50 to 1 000 ppm, to the fuel.

The novel polyisobutenamines I are used as a rule together with carrier oils. Carrier oils are known, for example, from K. Owen, Gasoline and Diesel Fuel Additives, John Wiley & Sons, 1989. Carrier oils based on polyalkylene glycols, for example their ethers and/or esters, as described in U.S. Pat. No. 5,004,478 or DE-A 3838918, are particularly suitable. The reaction products of long-chain alkanols or long-chain amines with alkylene oxides, such as ethylene oxide, propylene oxide or 1,2-butylene oxide (degree of alkoxylation preferably from 10 to 50), as disclosed, for example, in U.S. Pat. No. 4,877,416, propoxylates of dialkylphenols as described in DE-A 4142241, and mineral carrier oils (hydrocarbon oils, base oils), in particular those of the viscosity grade Solvent Neutral (SN) 500-2000, olefin polymers having molecular weights $\overline{M}_N$ of from 400 to 1800, especially based on poly-n-butene or polyisobutene (hydrogenated or unhydrogenated), are also suitable. The amount of carrier oil is as a rule from 1 to 1 000 ppm, preferably from 20 to 500 ppm, based on the total weight of the fuel. Relative to the polyisobutenamine, a smaller amount is required than in the case of known fuel additives based on polyisobutenamines. The weight ratio of polyisobutenamine I to carrier oil is preferably at least 1:1, especially from 1:1 to 20:1, in particular from 3:2 to 10:1. The novel polyisobutenamines can also be used without carrier oil as fuel additives.

The present invention furthermore relates to additive concentrates. These contain the polyisobutenamine I as a rule in an amount of from 10 to 80, preferably from 20 to 50, % by weight, based on the total weight of the concentrate, and the other additives, if required solvents and, if required, carrier oils. Furthermore, the additive concentrates may also contain conventional detergent additives, as described, for example, in J. Falbe et al., Tenside und Mineralöladditive, G. Thieme Verlag, Stuttgart 1978, page 223 et seq. or K. Owen (loc. cit.) page 23 et seq. However, their amount does not generally exceed the amount of novel polyisobutenes and is preferably below 25, in particular below 10, % by weight, based on the total weight of polyisobutenamine I and conventional detergent additive.

The examples which follow illustrate the invention without restricting it.

I. Analysis

The determination of the molecular weight ($\overline{M}_N$, $\overline{M}_W$) was carried out in the manner described above by means of GPC, mass spectrometry and/or $^1$H-NMR spectroscopy. The double bond content was determined by means of $^1$H-NMR spectroscopy (integration of the vinyl protons against methyl and methylene protons) or via the chlorine content. The residual chlorine content was determined by elemental analysis.

II. Preparation of the Polyisobutenamines

IIa. Preparation of the Polyisobutenes

PREPARATION EXAMPLE 1

Preparation of a Polyisobutene having an $\overline{M}_N$ of 670

The reaction vessel used was a 2 l four-necked flask equipped with dry ice condenser, dropping funnel, thermometer, septum, 20 magnetic stirrer and a further dropping funnel which has a bed of molecular sieve (3 Å, 250 g; dried for 16 h at 150° C./2 mbar) and a dry ice condenser. The reaction vessel was dried by double evacuation and flushing with dry nitrogen. 260 g (1 mol) of tetraisobutenyl chloride and 0.38 g (2 mmol) of 2,6-di-tert-butylpyridine were added to the flask through the septum. Thereafter, 400 ml of dried methylene chloride and 400 ml of dried hexane were condensed in succession into the dropping funnel containing the bed of molecular sieve and added dropwise so that the average residence time in the molecular sieve was about 15 minutes. Thereafter, 448.9 g (8 mol) of isobutene were condensed in the same dropping funnel and added to the flask via the molecular sieve with the same residence time. The flask content was cooled to −78° C. using a dry ice/acetone cooling bath while stirring, and 379.42 g (2 mol) of titanium tetrachloride were added via the septum. After a reaction time of 15 minutes, the reaction was stopped by adding 50 ml of isopropanol, and the reaction mixture was warmed up to 0° C., washed with three times 200 ml of water, dried over sodium sulfate, freed from the solvent at 200° C. under reduced pressure to a final pressure of 2 mbar and treated with basic alumina.

690 grams of clear oil, $\overline{M}_N$=670 dalton, $\overline{M}_W/\overline{M}_N$=1.18; viscosity at 100° C. 43 mm$^2$/s; proportion of terminal double bonds 65%, chlorine content less than 1 ppm.

PREPARATION EXAMPLE 2

Preparation of a Polyisobutene having an $\overline{M}_N$ of 1300

Preparation example 2 was carried out analogously to preparation example 1, except that 78 g (0.3 mol) of tetraisobutenyl chloride, 113.8 g (0.6 mol) of titanium tetrachloride and 336.7 g (6 mol) of isobutene were used: 408 g of clear oil, $\overline{M}_N$=1300, $\overline{M}_W/\overline{M}_N$=1.15; content of terminal double bonds 65%, viscosity at 100° C. 103 mm$^2$/s; chlorine content 3 ppm.

IIb. Aminofunctionalization of the Polyisobutenes

EXAMPLE 1

Aminofunctionalization of the Polyisobutene from Preparation Example 1

1200 ml of a 1 molar BH$_3$ solution in THF were initially taken in a stirred 2 l flask and cooled to 0° C. and 210 g of polyisobutene from example 1 were added so that the temperature could be kept at 0° C. After a reaction time of 5 hours at 0° C., the mixture was cooled to −10° C. and aqueous sodium hydroxide solution (6 N; 250 ml) was added with vigorous stirring so that the temperature did not exceed 0° C. As soon as the addition was complete, 30% strength hydrogen peroxide (187 ml; 1.65 mol) was added so that the temperature of the reaction mixture did not exceed 40° C. Vigorous stirring was then carried out for a further 2 hours at 40° C. Thereafter, the phases were separated, the organic phase was evaporated down under reduced pressure by distilling off 1 000 ml of THF at 40° C., 300 ml of heptane and 50 ml of isopropanol were added and washing with water was carried out (three 500 ml portions). The solvent was then distilled off under reduced pressure at 150° C. to a final pressure of 2 mbar. The residue had a hydroxyl number of 14.1 and contained 7.8% by weight of unconverted polyisobutene (determined by HPLC).

This residue was then converted into a 50% strength by weight solution with isododecane and subjected to reductive amination over a hydrogenation catalyst in a stirred reciprocating autoclave at 190° C. and 190 bar hydrogen pressure in the presence of 30% by weight, based on the solution used, of ammonia, with a residence time of one hour. After the reaction mixture had been cooled and excess ammonia expelled in gaseous form at 40° C. and atmospheric pressure, the product obtained was washed neutral. The titrimetric determination of the amine number gave a value of 38.2, and the functionalization yield was 98%.

EXAMPLE 2

Aminofunctionalization of the Polyisobutene from Preparation Example 2

The hydroboration/oxidative cleavage and subsequent reductive amination were carried out as in example 1. The degree of functionalization was 98% by weight and the amine number 20.4.

III. Testing of the Performance Characteristics as Fuel Additives

The intake valve cleanliness was tested according to CEC method F-05-A-93 in an Opel Kadett engine. A commercial European premium grade fuel according to EN 228, to which either no fuel additive (comparative example 1) or a fuel additive not according to the invention and based on polyisobutenamines (comparative example 2) or a novel polyisobutenamine (example 1 and example 2) was added, was used for this purpose. The concentration of polyisobutenamine in the additive-containing fuels was in each case 200 mg per kilogram of fuel.

The fuel additive from comparative example 2, not according to the invention, is a commercial isobutenamine (Kerocom PIBA) from BASF, based on a polyisobutene having a number average molecular weight of 1 000 and a polydispersity of 1.65, which was obtained by hydroformylation and subsequent reductive amination with ammonia according to example 1 of EP-A 244 616.

For the determination of valve sticking according to CEC F-16-T96, three additive-containing fuels were prepared as described above, the concentrations of polyisobutenamine being 1 g per kilogram of fuel here. A reference carrier oil comprising poly-1-butene oxide (Kerocom®3364 from BASF Aktiengesellschaft) was added in concentration steps of 0.03 g per kg of additive-containing fuel to these additive-containing fuels so that fuels having carrier oil concentrations of from 0.03 to 0.15 g/kg were obtained. With increasing concentration, the addition of carrier oil reduces the viscosity of the additive-containing fuel and thus also the tendency to sticking of the valves. The concentration of carrier oil required reliably to prevent sticking of the valves under the test conditions was then determined by means of the CEC-F-1b-T96 method at 5° C. Table 1 shows the concentrations of carrier oil at which the test was successfully passed, i.e. without sticking of the valves, and the concentration from which undesirable sticking of the valves was observed. Polyisobutenamines which pass the test with addition of very little carrier oil are therefore advantageous in this test since this indicates particularly advantageous viscosity behavior. From the comparison of the data summarized in table 1, it is evident that the novel polyisobutenamines are effective to very effective in keeping valves clean and have substantially superior viscosity behavior.

TABLE 1

| Ex. | $\overline{M}_N$[1] | $\overline{M}_W/\overline{M}_N$[2] | Valve deposits [mg/valve] | Sticking of valves Carrier oil [g/kg][3] | Rating |
|---|---|---|---|---|---|
| CE1 | — | — | 530 | — | passed |
| CE2 | 1000 | 1.65 | 12 | 1.2 | passed |
|  |  |  |  | 0.9 | failed |
| E1 | 670 | 1.18 | 15 | 0.3 | passed |
|  |  |  |  | 0.0 | failed |
| E2 | 1300 | 1.15 | 5 | 0.9 | passed |
|  |  |  |  | 0.6 | failed |

[1]$\overline{M}_N$ = Number average molecular weight of the polyisobutenyl radical
[2]$\overline{M}_W$ = Weight average molecular weight; $\overline{M}_W/\overline{M}_N$ = Polydispersity
[3]European premium grade fuel according to EN 228, concentration of the carrier oil in grams per kilogram of fuel

We claim:

1. A polyisobutenamine of the formula I:

$$R—X \quad (I)$$

where R is a polyisobutenyl radical having a number average molecular weight $M_N$ of from 500 to 1500 and a polydispersity $M_W/M_N$ of no more than 1.3; and
X is a radical of the formula II

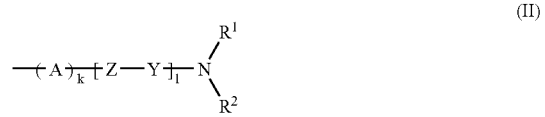

(II)

where k and l, independently of one another, are 0 or 1,
A is methylene or phenylene,
Z is oxygen or NR', where R' is hydrogen, alkyl, hydroxyalkyl, aminoalkyl, cycloalkyl, aryl, aralkyl or a group —Y—NR¹R²,
—Y— is a group

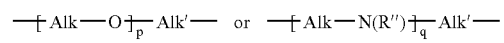

where Alk is $C_2$-$C_4$-alkylene, p and q, independently of one another, are an integer from 0 to 25 and R″ is hydrogen, alkyl or aryl, and Alk' is alkylene which may be interrupted by 1, 2 or 3 nonneighboring oxygen atoms, or is cycloalkylene, $R^1$ and $R^2$, independently of one another, are hydrogen, alkyl, cycloalkyl, hydroxyalkyl, aryl or aralkyl or a group Y—NR³R⁴, where Y has the abovementioned meanings and $R^3$ and $R^4$, independently of one another, are hydrogen, alkyl, cycloalkyl, hydroxyalkyl, aryl or aralkyl, $R^3$ and $R^4$ together with the nitrogen atom to which they are bonded form an unsubstituted or substituted, saturated heterocycle which may contain a further hetero atom selected from oxygen and nitrogen, $R^1$ and/or $R^2$ may also be R or —$CH_2$—R if l is 0, R having the abovementioned meaning, or $R^1$ and $R^2$ together with the nitrogen atom to which they are bonded form an unsubstituted or substituted, saturated heterocycle which may contain a further hetero atom selected from oxygen and nitrogen, and the polyisobutenamine is obtained by a process wherein i) isobutene is polymerized in the presence of an initiator system comprising:
   a) a Lewis acid selected from covalent metal chlorides and semimetal chlorides, and
   b) at least one compound of the formula III, $$CH_3—C(CH_3)_2—[CH_2—C(CH_3)_2]_m\text{-FG}$$

where m is 0, 1, 2, 3 or 4 and FG is halogen, OH, alkoxy, acyloxy, $CH_2C(CH_3)CH_2OH$ or a group

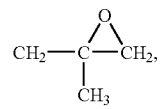

in a solvent which is inert with respect to the Lewis acid, at a molar ratio of Lewis acid to compound III of from 5:1 to 1:20, to give a polyisobutene which contains at least 80 mol % of olefinic terminal groups and has a number average molecular weight $M_N$ of from 500 to 1500 and a polydispersity $M_W/M_N$ of no more than 1.3, and ii) a radical having amino groups is introduced at the olefinic double bonds of the polyisobutene obtained in step i).

2. A process for the preparation of a polyisobutenamine of the formula I:

$$R—X \quad (I)$$

where
R is a polyisobutenyl radical having a number average molecular weight $M_N$ of from 500 to 1500 and a polydispersity $M_W/M_N$ of no more than 1.3, and X is a radical of the formula II

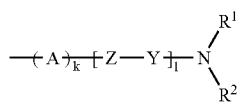
(II)

where k and l, independently of one another, are 0 or 1,
A is methylene or phenylene,
Z is oxygen or NR', where
R' is hydrogen, alkyl, hydroxyalkyl, aminoalkyl, cycloalkyl, aryl, aralkyl or a group —YNR$^1$R$^2$,
—Y— is a group

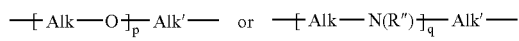

where Alk is $C_2$-$C_4$-alkylene, p and q, independently of one another, are an integer from 0 to 25 and R" is hydrogen, alkyl or aryl, and Alk' is alkylene which may be interrupted by 1, 2 or 3 nonneighboring oxygen atoms, or is cycloalkylene,
R$^1$ and R$^2$, independently of one another, are hydrogen, alkyl, cycloalkyl, hydroxyalkyl, aryl or aralkyl or a group Y—NR$^3$R$^4$, where Y has the abovementioned meanings and R$^3$ and R$^4$, independently of one another, are hydrogen, alkyl, cycloalkyl, hydroxyalkyl, aryl or aralkyl, R$^3$ and R$^4$ together with the nitrogen atom to which they are bonded form an unsubstituted or substituted, saturated heterocycle which may contain a further hetero atom selected from oxygen and nitrogen,
R$^1$ and/or R$^2$ may also be R or —CH$_2$—R if l is 0, R having the abovementioned meaning, or
R$^1$ and R$^2$ together with the nitrogen atom to which they are bonded form an unsubstituted or substituted, saturated heterocycle which may contain a further hetero atom selected from oxygen and nitrogen; the process comprising the steps of:
i) polymerizing isobutene in the presence of an initiator system comprising
a) a Lewis acid selected from covalent metal chlorides and semimetal chlorides,
b) and at least one compound of the formula III,

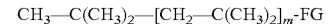

where m is 0, 1, 2, 3 or 4 and FG is halogen, OH, alkoxy, acyloxy, CH$_2$C(CH$_3$)CH$_2$OH or a group

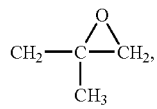

in a solvent which is inert with respect to the Lewis acid, at a molar ratio of Lewis acid to compound III of from 5:1 to 1:20, to give a polyisobutene which contains at least 80 mol % of olefinic terminal groups and has a number average molecular weight M$_N$ of from 500 to 1500 and a polydispersity M$_W$/M$_N$ of no more than 1.3, and
ii) introducing a radical having amino groups at the olefinic double bonds of the polyisobutene obtained in step i).

3. A process as claimed in claim 2, wherein the compound III is used in an amount of from 0.02 to 0.3 mol per mole of isobutene.

4. A process as claimed in claim 2, wherein the Lewis acid is selected from titanium(IV) chloride and boron trichloride.

5. A process as claimed in claim 2, wherein the initiator system additionally contains at least one aprotic polar compound IV which is suitable for complex formation with the Lewis acid or with the carbocation formed under reaction conditions or the cationogenic complex of Lewis acid and compound III.

6. A process as claimed in claim 5, wherein the compound IV is selected from pyridine, alkylpyridines and nonpolymerizable, aprotic organosilicon compounds having at least one Si—O bond.

7. A process as claimed in claim 5, wherein the compound IV and the compound III are used in a molar ratio of IV:III of from 1:1 to 1:1000.

8. A process as claimed in claim 2, wherein the solvent for the polymerization is selected from hydrocarbons of 2 to 10 carbon atoms, inert halohydrocarbons of 1 to 3 carbon atoms and mixtures thereof.

9. A process as claimed in claim 2, wherein the solvent is removed at temperatures of at least 150° C. in order to obtain the polyisobutenes.

10. A process as claimed in claim 2, wherein the functional group X in step ii) is introduced by reaction of the polyisobutene obtained in step i), according to one of the following processes (1) to (7), and, if required, a subsequent alkoxylation:
(1) hydroformylation of the polyisobutene with subsequent reductive amination of the hydroformylation product in the presence of ammonia, amines or amino alcohols and hydroformylation of the polyisobutene in the presence of ammonia, amines or amino alcohols under reducing conditions;
(2) hydroboration of the polyisobutene with subsequent oxidative cleavage of the borane adduct and subsequent reductive amination in the presence of ammonia, amines or amino alcohols;
(3) hydroboration or hydroformylation under reducing conditions to give a polyisobutenyl alcohol, followed by an alkoxylation and a reductive amination in the presence of ammonia, amines or amino alcohols;
(4) reaction of the polyisobutene with a nitrogen oxide-containing oxidizing agent and subsequent reduction of the NO$_x$ groups thus introduced to NH$_2$ groups;
(5) epoxidation of the polyisobutene and subsequent reaction of the epoxidation product with ammonia, an amine or an amino alcohol with subsequent or simultaneous elimination of water and catalytic reduction;
(6) hydrocyanation of the polyisobutene under acidic catalysis and subsequent hydrolysis in a Ritter reaction or
(7) reaction with phenol under Friedel-Crafts conditions and subsequent reaction of the polyisobutenylphenol with formaldehyde and amine in a Mannich reaction.

11. A method for reducing deposits in valves, carburetors or injection systems of a gasoline or diesel engine, comprising adding to a fuel for the engine a deposit reducing effective amount of a polyisobutenamine as claimed in claim 1.

12. An additive concentrate containing at least one polyisobutenamine as claimed in claim 1 in amounts of from 0.1 to 80% by weight, in addition to a fuel additive component other than the polyisobutenamine.

13. A fuel composition containing a principal amount of a liquid hydrocarbon fuel and a detergent-active and/or viscosity-improving amount of at least one polyisobutenamine as claimed in claim 1.

14. A polyisobutenamine of the formula I:

R—X  (I)

where R is a polyisobutenyl radical having a number average molecular weight $M_N$ of from 500 to 1500 and a polydispersity $M_W/M_N$ of no more than 1.3; and
X is a radical of the formula II

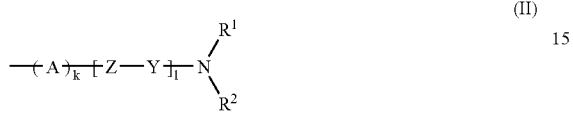
(II)

where k and l, independently of one another, are 0 or 1,
A is methylene or phenylene,
Z is oxygen or NR', where
R' is hydrogen, alkyl, hydroxyalkyl, aminoalkyl, cycloalkyl, aryl, aralkyl or a group —Y—NR$^1$R$^2$,
—Y— is a group

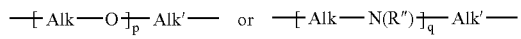

where Alk is $C_2$-$C_4$-alkylene, p and q, independently of one another, are an integer from 0 to 25 and R" is hydrogen, alkyl or aryl, and Alk' is alkylene which may be interrupted by 1, 2 or 3 nonneighboring oxygen atoms, or is cycloalkylene,
R$^1$ and R$^2$, independently of one another, are selected from hydrogen, $C_1$-$C_6$-alkyl, phenyl, 2-hydroxyethyl, 2-aminoethyl, 3-aminopropyl, 2-di($C_1$-$C_4$-alkyl)aminoethyl, 3-di($C_1$-$C_4$-alkyl)aminopropyl or radicals of the formulae [CH$_2$—CH$_2$—O]$_{p'}$—CH$_2$—CH$_2$OH and [CH$_2$—CH$_2$—NH]$_{q'}$—CH$_2$—CH$_2$NH$_2$, where p' and q' independently of one another are 1 to 20, or a group NR$^1$R$^2$ selected from piperidine, piperazine, N—($C_1$-$C_4$-alkyl)piperazine or morpholine radical, and the polyisobutenamine is obtained by a process wherein i) isobutene is polymerized in the presence of an initiator system comprising:
   a) a Lewis acid selected from covalent metal chlorides and semimetal chlorides, and
   b) at least one compound of the formula III, CH$_3$—C(CH$_3$)$_2$—[CH$_2$—C(CH$_3$)$_2$]$_m$-FG where m is 0, 1, 2, 3 or 4 and FG is halogen, OH, alkoxy, acyloxy, CH$_2$C(CH$_3$)CH$_2$OH or a group

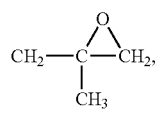

in a solvent which is inert with respect to the Lewis acid, at a molar ratio of Lewis acid to compound III of from 5:1 to 1:20, to give a polyisobutene which contains at least 80 mol % of olefinic terminal groups and has a number average molecular weight $M_N$ of from 500 to 1500 and a polydispersity $M_W/M_N$ of no more than 1.3, and ii) a radical having amino groups is introduced at the olefinic double bonds of the polyisobutene obtained in step i).

* * * * *